July 12, 1966
H. J. SADLER ETAL
3,260,541
COUPLER FOR POWER TAKE-OFF
Filed March 23, 1962
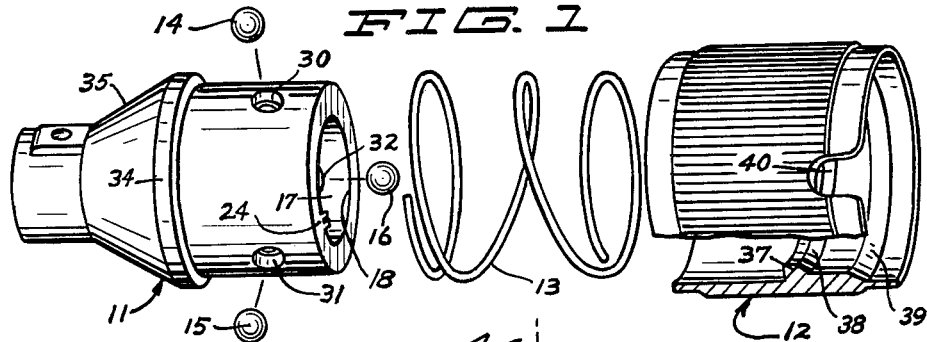
FIG. 1
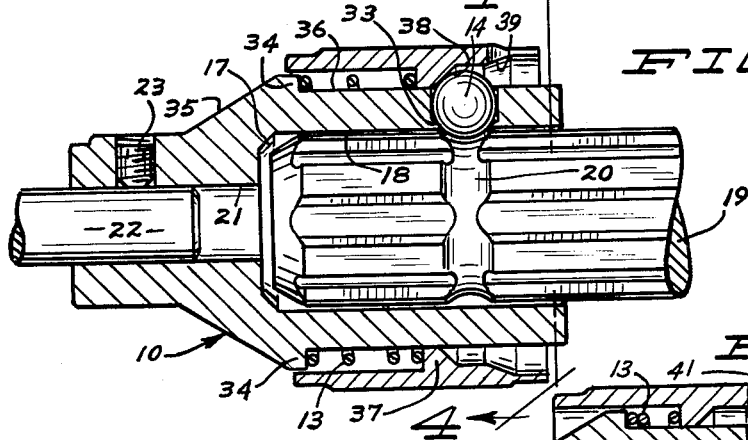
FIG. 2
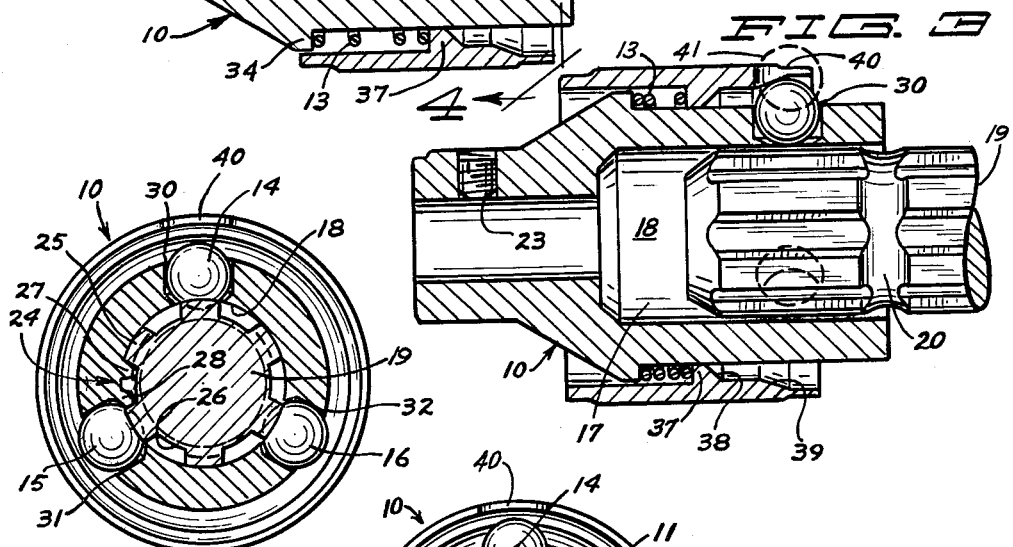
FIG. 3
FIG. 4
FIG. 5
INVENTORS
HARRY J. SADLER
ERNEST E. COOK
BY Meyers & Peterson
ATTORNEYS 3,260,541
COUPLER FOR POWER TAKE-OFF
Harry J. Sadler, Minneapolis, and Ernest E. Cook, Anoka, Minn., assignors, by mesne assignments, to Hypro, Inc., Minneapolis, Minn., a corporation of Ohio
Filed Mar. 23, 1962, Ser. No. 182,018
1 Claim. (Cl. 287—53)

This invention relates to mechanical couplers and more particularly to a coupler adapted for use on tractors and the like having splined power take-off shafts.

An object of this invention is to provide an efficient power take-off coupler which lends itself to easy and rapid mounting upon, and dismounting from, power take-off shafts.

Another object is to provide a power take-off coupler which is adapted for direct use with a plurality of splined power take-off shaft designs.

A further object of this invention is to provide a power take-off coupler which is highly simplified in design and has a minimum of component parts and complicated elements which will facilitate manufacture thereof.

Another object is to provide a coupler which has no peripheral protuberances which thereby will render the coupler entirely safe to the operator during use.

These and other objects and advantages of this invention will more fully appear from the following description, made in connection with the accompanying drawing, wherein like reference characters refer to the same or similar parts throughout the several views and in which:

FIGURE 1 is an exploded perspective assembly view showing each of the coupler elements prior to assembly. One of the elements is partially broken away to expose the side-wall configuration.

FIGURE 2 is an enlarged cross sectional side view showing the coupler assembled and mounted on a typical splined power take-off shaft and further showing a coupled shaft which is to receive the powered rotation. In this view the sleeve is in the normal position.

FIGURE 3 is a view similar to that of FIGURE 2 but showing the coupler elements in retracted position for removal of the coupler from the splined shaft.

FIGURE 4 is a full cross sectional end view of FIGURE 2 taken on line 4—4 and showing one configuration of a splined shaft.

FIGURE 5 is a view similar to that of FIGURE 4 and showing a differently configured splined shaft. This view is also similar to FIGURE 3 in that it shows the elements in a position for removal of the coupler from the splined shaft.

Referring again to FIGURE 1, the basic elements of the coupler, referred to generally as 10, are clearly shown in assembly position. They consist of an adapter 11, a sleeve 12, a biasing compression spring 13, and three locking balls 14, 15, and 16.

With reference now to both FIGURES 1 and 2, the adapter 11 is a single cast element having a pair of internal cylindrical openings which are axially aligned and substantially co-axial with the adapter itself. The spline opening 17 defined by a cylindrical side wall 18 is adapted to receive the splined power take-off shaft 19 of a conventional tractor or some other similarly powered shaft. The splined shaft 19 is provided with an annular groove 20 that is utilized for locking or securing couplings thereto thus preventing axial movement of the coupler during operation. As shown in FIGURE 2, the other cylindrical opening defines a bore 21 for receiving the coupled shaft 22 of a machine which is to receive powered rotation and, in turn, drive a water pumping mechanism or the like. A set screw 23 is provided to secure the shaft 22 to the adapter 11 so that full torque will be transmitted from the splined shaft 19 to the shaft 22.

To cause transmittal of the torque from the splined shaft 19 to the adapter, a split rib 24 is provided (see FIGURES 4 and 5) which is integrally cast with the side-wall 18. This split rib extends for substantially the longitudinal length of the spline opening 17 and, depending on the size of splined shaft, will fit entirely between adjacent spline ribs 25 and within groove 26, as shown in FIGURE 4, or may receive a spline rib between the individual rib sections 27 and 28 as shown in FIGURE 5. In the first instance the shaft 19 of FIGURE 4 has six splines while in the latter instance the shaft 29 has twenty-one splines. Thus the adapter may be used on more than one spline arrangement because of the split configuration of the rib 24.

Located at spaced intervals around the adapter are three small cylindrical openings 30, 31, and 32, each of which has been bored to a depth which leaves a slight restricting shoulder 33. The restricting shoulder prevents the locking ball (14, 15, and 16) from passing completely through the cylindrical opening (30, 31, and 32) and into the spline opening 17 when the adapter is removed from the splined shaft 19. As noted, the cylindrical openings are of substantially the same size diameter as the locking balls thus allowing free, but confined movement of the balls within the openings.

Referring to FIGURE 2, the apapter 11 is provided with an adapter shelf 34 at the point where the frusto conical taper 35 joins the outer cylindrical spring contacting surface 36. One end of the compression spring 13 is seated against the shelf 34. The other end of the spring expands under compressive force to seat against a sleeve shelf 37, as readily seen in FIGURES 2 and 3.

Formed on the opposite side of the sleeve shelf 37 is a first annular cammed surface 38, which as shown in FIGURE 2, cams the locking balls radially inward such that they will lock into the annular groove 20 to prevent the adapter from axially moving upon the splined shaft 19. A second cammed surface 39 is also provided as an integral part of the sleeve 12 which is on a larger diameter and accordingly allows the locking balls to retract from their position as shown in FIGURE 2 to that shown in FIGURE 3. In this event the coupler 10 may be removed from the splined shaft 19 by axially retracting the sleeve 12 against the bias of spring 13. When the coupler 10 is being installed upon the splined shaft, the sleeve 12 need only be manually retracted to allow the balls 14, 15, and 16 to position on the outer surface of the splined shaft. Subsequent release of the sleeve will cause the cammed surface 39 to force against each ball so that when the groove is encountered, each ball will be urged radially inward. Finally, the cammed surface 38 will urge the balls into the protruding position for locking.

When it is necessary to remove the balls 13, 14 and 15 for replacement or for disassembly of the coupling, a ball opening 40 (see FIGURES 1 and 3) is rotated and aligned with each of the three positions of the three cylindrical openings 30, 31, and 32. Thus, with the ball opening 40 positioned as shown in FIGURE 3, the ball is free to roll out of the cylindrical opening 30 as indicated by the dashed line 41. With all of the balls thus removed, it will readily be seen from FIGURE 2 that the cam surface 38 would no longer have any counteractant force against the spring bias so that consequently the entire sleeve 12 may be withdrawn from its telescoping position and separated from the spring 13 and adapter 11. Thus the balls 14, 15, and 16 have served a dual purpose of retaining the sleeve upon the adapter when under spring bias in addition to providing a locking means to secure the coupling to the spline.

Reflecting upon the structure of this invention, it is noted that a coupler has been provided which requires a very minimum of elements, each of which is simple and easy to manufacture, and, if necessary, replace. Not only is this true but a coupling has been disclosed which may be firmly attached to a plurality of spline configurations without any modification of the elements themselves.

It will, of course, be understood that various changes may be made in the form, details, arrangements and proportions of the parts without departing from the scope of this invention as set forth in the appended claim.

What is claimed:

A coupler adapted for use on the splined power take-off shaft of a tractor, said splined shaft having a free end and an annular groove adjacent thereto, said splined shaft further having a plurality of longitudinally disposed spline grooves and ribs positioned around the circumference of said shaft, said coupler comprising, an adapter having two axially aligned cylindrical openings on the axis of said adapter, one of said openings being a spline receiving opening defined by a cylindrical wall, said spline opening of which is adapted to slidably interfit with splined tractor power take-off shafts, a split rib formed integrally with said cylindrical wall and extending longitudinally thereof having at least two individual rib sections, said rib sections being adapted to seat in a single spline groove of one configured spline and alternately to have a spline rib positioned between said rib sections as well as on either side of said rib sections, the other cylindrical opening in said adapter being adapted to reecive a coupled shaft which is to receive powered rotation, said adapter further having a plurality of radial bores extending substantially through said cylindrical wall which defines said spline opening, a locking ball positioned in each bore and adapted to partially extend into said spline opening whereby to seat in said annular groove of said spline and to partially extend outwardly of said cylindrical wall, a cylindrical sleeve telescopically surrounding said adapter adjacent the spline opening and having a pair of internal annular camming surfaces each at a different radial dimension, a spring bias interposed between said adapter and said sleeve for urging said sleeve toward said spline opening whereby one of said camming surfaces will urge each said locking ball into said spline shaft annular groove when said sleeve is in a normal position and the other camming surface will urge said ball against a spline groove when said sleeve is in a retracted position and said coupler is being removed from said splined shaft, said sleeve further having a ball opening which will permit removal of each locking ball from the coupler when said ball opening is successively positioned in registry with each ball.

References Cited by the Examiner

UNITED STATES PATENTS

| 691,759 | 1/1902 | George et al. | 287—2 |
| 2,680,636 | 6/1954 | Griffin | 287—119 |
| 2,807,473 | 9/1957 | Kiehne | 279—75 X |
| 3,179,450 | 4/1965 | Recker | 287—53 |

FOREIGN PATENTS

| 1,242,209 | 8/1960 | France. |
| 111,218 | 7/1944 | Sweden. |

CARL W. TOMLIN, *Primary Examiner.*

A. V. KUNDRAT, *Assistant Examiner.*